United States Patent [19]

Lew

[11] Patent Number: 5,490,719
[45] Date of Patent: Feb. 13, 1996

[54] RACING WHEEL

[75] Inventor: Paul E. Lew, Indianapolis, Ind.

[73] Assignee: Wear and Tear, Inc., Indianapolis, Ind.

[21] Appl. No.: 276,258

[22] Filed: Jul. 18, 1994

Related U.S. Application Data

[63] Continuation-in-part of Ser. No. 169,582, Dec. 17, 1993, Pat. No. 5,419,619.

[51] Int. Cl.⁶ ................................................. B60B 21/00
[52] U.S. Cl. ............................. 301/5.1; 301/5.24; 305/7
[58] Field of Search ................................ 305/6, 7; 301/1, 301/5.1, 5.24, 63.1, 64.7, 105.1, 111, 124.1, 95

[56] References Cited

U.S. PATENT DOCUMENTS

| 858,489 | 7/1907 | Vaughan | 418/6 |
|---|---|---|---|
| 917,967 | 4/1909 | Schmitz | 305/7 |
| 1,167,307 | 1/1916 | McCandless | 305/7 |
| 1,566,467 | 12/1925 | Iznaga | 305/7 |
| 2,843,426 | 7/1958 | Nojima | 305/7 X |
| 3,194,583 | 7/1965 | Nottage | 305/7 |
| 3,329,444 | 7/1967 | Lidov | 280/210 |
| 4,045,096 | 8/1977 | Lidov | 305/7 |
| 4,465,321 | 8/1984 | Berg | 301/5.1 |
| 4,735,459 | 4/1988 | Massonnet | 301/5.1 X |
| 4,818,030 | 4/1989 | Yoshida | 301/5.24 |
| 4,930,843 | 6/1990 | Lewis | 301/64.7 |
| 5,071,196 | 12/1991 | Sbarro | 301/5.1 |

Primary Examiner—Russell D. Stormer
Attorney, Agent, or Firm—Baker & Daniels

[57] ABSTRACT

A racing wheel for a vehicle such as a bicycle. The wheel includes a rotationally stationary inner component connectable to the bicycle, a rotatable outer hoop having a bearing engaging surface, a ground engaging tread disposed on the outer hoop, and bearings mounted on the inner component to be rotationally stationary therewith. The bearings each include a support surface contoured to operatively engage the outer hoop bearing engaging surface such that the outer hoop is axially and radially supported relative to the inner component to allow rotation therebetween. The bearings are positioned around the inner component at particularly selected locations to achieve high wheel performance.

11 Claims, 12 Drawing Sheets

RACING WHEEL

This application is a continuation-in-part of application Ser. No. 08/169,582, filed Dec. 17, 1993 and now U.S. Pat. No. 5,419,619.

BACKGROUND OF THE INVENTION

This invention relates to wheels for vehicles such as bicycles and wheelchairs, and, in particular, to racing wheels designed to lessen the weight and improve the aerodynamics of the vehicle.

Speed sport athletes such as cyclists continue to seek bicycle equipment improvements which gain them an advantage in racing competitions. Bicycle wheels are one type of equipment specifically targeted for improvement, as designers attempt to develop wheels with improved weight and aerodynamic characteristics relative to existing bicycle wheels. Previous wheel enhancements which decrease wheel weight have been accomplished by modifying the materials of wheel construction. For instance, heavy metal wheel rims of the past have been replaced with lower weight, high strength composites. These composites are typically carbon fiber composite shells having filled, lightweight cores constructed from, for instance, various foam materials, balsa wood, or NOMEX™.

While altering the materials of construction has achieved lower wheel weights, standard wheel designs continue to suffer from a major shortcoming. Specifically, the wheel hub and its associated rotating spokes and bicycle frame tripletree detrimentally affect both the aerodynamic and weight characteristics of the wheel. Standard wheels include a central hub, disposed at the wheel's axis of rolling rotation, with numerous connected spokes extending radially therefrom to connect with the tire supporting wheel rim. Even wheels wherein the spokes have been replaced with a solid disc for aerodynamic purposes still employ a hub. The central hub is then connected to the remainder of the bicycle via the bicycle frame tripletree, i.e. the tubular component which at its upward end is a single tube, operatively connected to the handlebars, and at its lower end includes a tubular forked extension which fits over the sides of the wheel and connects with both axial sides of the hub. The spokes, hub and forked extension of the tripletree add weight to the bicycle which if avoided would make the bicycle desirably lighter. In addition, the spokes, hub and particularly the forked extension of the tripletree hinder the aerodynamics of the bicycle as they frequently axially project beyond the forward profile of the wheel, i.e. the tire axial thickness. Consequently, these pieces of equipment encounter passing air during operation and generate undesirable drag on the bicycle.

In addition to increasing wheel weight and thereby vehicle weight, rotating spokes can be hazardous to persons including the vehicle operator. For instance, when a person is riding a bicycle, rigid materials such as sticks which inadvertently are introduced between the spokes and the tripletree forked extension can bind the wheel, thereby throwing the rider and subjecting her to injury. Moreover, a person can be seriously injured if her hand is accidentally inserted into the rapidly rotating spokes of a wheel on a wheelchair or a bicycle.

Previous attempted designs for hubless, spokeless wheels for bicycles, such as those disclosed in U.S. Pat. Nos. 4,045,096 and 3,329,444, may be operational but are nonetheless undesirable from a standpoint of optimizing vehicle weight or aerodynamics. Because these designs involve shrouds or frame members which partially encapsulate a significant portion of the ground engaging tread, their forward profile is wider than the tread for much of the height of the wheel and consequently increased drag is present. In addition, the multiplicity of fasteners involved in the assembly of the shrouds and the multiplicity of bearings employed add unnecessary weight.

U.S. Pat. No. 5,071,196 discloses hubless spokeless wheels for motor vehicles apparently having annular bearing means which extend around the entire circumference of the wheel on both its stationary and rotating components. While such a bearing design may be advantageous from a standpoint of fully minimizing friction, introducing excess bearings in situations such as bicycle racing competitions where minimizing weight is of heightened importance may be counterproductive.

SUMMARY OF THE INVENTION

In one form thereof, the wheel of the present invention is for a bicycle and includes a rotationally stationary asymmetrical inner hoop connectable to the bicycle, a rotatable outer hoop comprising a bearing engaging surface, a ground engaging tread disposed on the outer hoop, and at least one bearing mounted on the inner hoop to be rotationally stationary therewith. The bearing includes a support surface contoured to operatively engage the outer hoop bearing engaging surface such that the outer hoop is axially and radially supported relative to the inner hoop to allow rotation therebetween. A rotationally stationary inner component with a number of non-rotating radial spokes can be substituted for the asymmetrical inner hoop.

In another form thereof, the wheel of the present invention, which is for a bicycle movable in a forward direction over a horizontal support surface, includes a rotationally stationary inner component connectable to the bicycle and a rotatable outer hoop including a bearing engaging surface and an axis of rolling rotation, wherein the outer hoop is concentric with the inner component. The wheel also includes a ground engaging tread disposed on the outer hoop, and first, second, third and fourth bearings all mounted on the inner component to be rotationally stationary therewith. The first bearing is operationally positioned around the inner component at an angular location between about 10° and 23° rearward of a vertical line passing through the axis of rolling rotation. The second bearing is operationally positioned around the inner component at an angular location between about 100° and 130° forward of the first bearing. The third bearing is operationally positioned around the inner component at an angular location between about 105° and 135° rearward of the first bearing. The fourth bearing is operationally positioned around the inner component at an angular location within an obtuse angle between the second bearing, the axis of rolling rotation, and the third bearing.

An advantage of the present invention is that the lightweight construction of the wheel allows useful utilization of the wheel in competition bicycles, or in other applications, such as wheelchairs, in which a lighter weight wheel is desirable. Another advantage of the present invention is that its design achieves a highly aerodynamic wheel design which promotes superior racing performance. Another advantage of the present invention is that safety can be improved as no rotating spokes potentially harmful to introduced body parts need be employed. Still another advantage of the present invention pertains to its improved dimensional clearance, which is valuable when the wheel is employed as a wheelchair wheel. For example, because no hub or spokes need to axially protrude beyond the tire profile, a wheelchair may be able to fit through some passageways otherwise inaccessible to the wheelchair. Still another advantage of the present invention is that its passive suspension system accounts for variances between the design and constructed shape of the tire engaging outer hoop. Still another advantage of the present invention is that standard racing tires with radially projecting inflation valve stems can be accommodated.

BRIEF DESCRIPTION OF THE DRAWINGS

The above-mentioned and other advantages and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several figures. Although the drawings represent embodiments of the invention, the drawings are not necessarily to scale and certain features may be exaggerated in order to better illustrate and explain the present invention.

DESCRIPTION OF THE PREFERRED EMBODIMENTS

Figure 1:
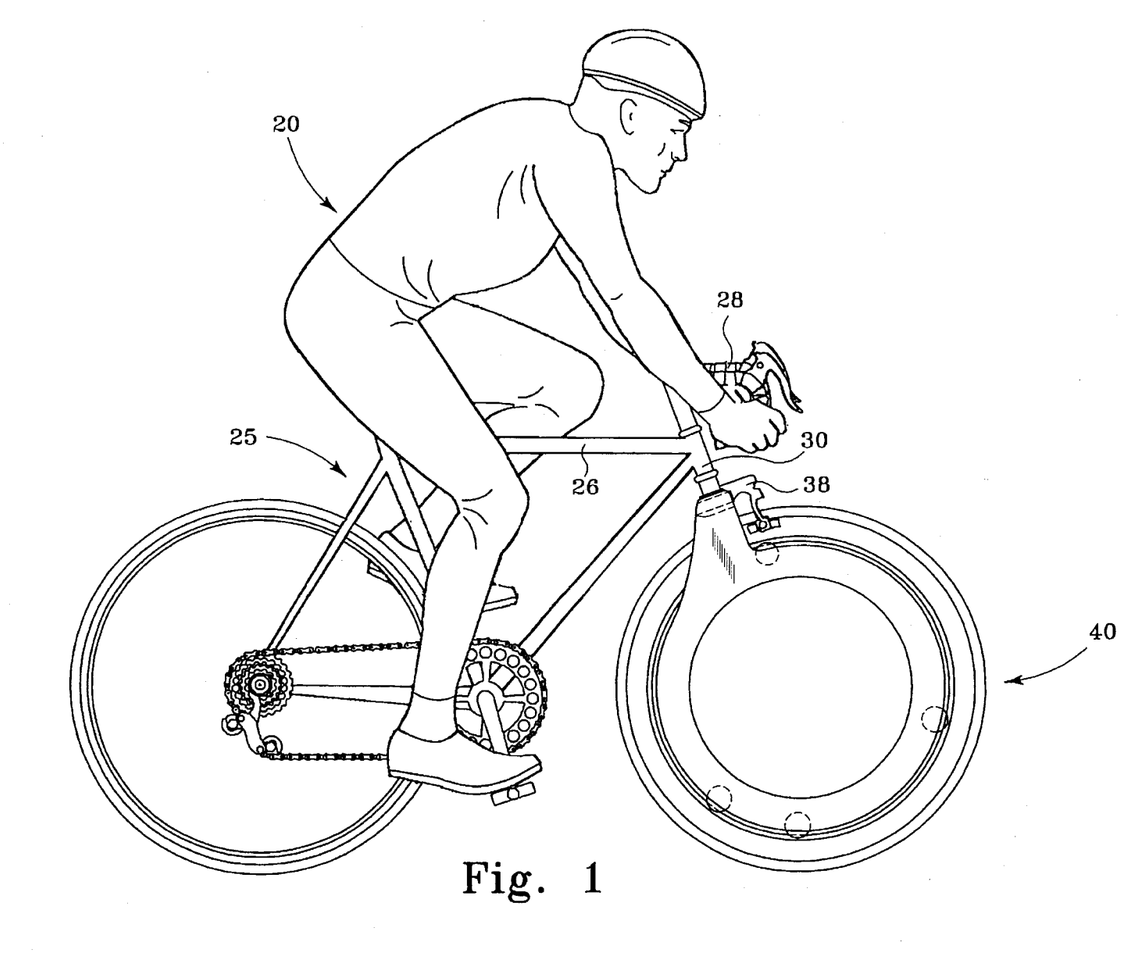
FIG. 1 is a side elevational view of a cyclist on a bicycle having a racing wheel of the present invention as its front wheel.

Referring now to FIG. 1, there is illustrated an embodiment of the present invention employed as a front wheel, generally designated 40, of a competition bicycle, generally designated 25, being used by cyclist 20. While wheel 40 is shown and further explained herein with reference to bicycles, it is believed that this particular embodiment is merely illustrative of one type of beneficial application of the present invention. The teachings of the present invention are envisioned finding useful application with other vehicles, for instance wheelchairs, where the lightweight feature of the wheel, the aerodynamic feature of the wheel, the lack of rotating spokes feature of the wheel, or all of these features are beneficial.

Except for wheel 40, bicycle 25 is shown as essentially an ordinary competition bicycle and includes tubular frame 26, handlebars 28, and brake 38. The operative connection between brake 38 and the braking grips on handlebars 28 is not shown but is well known in the art. The feature of bicycle 25 most relevant to the illustrated invention embodiment is head tube 30. As is typical in the mounting of a front wheel for both recreational and competition bicycles, cylindrical head tube 30 receives a steerer tube 42 (See FIG. 2) extending generally upwardly from wheel 40. As is well known in the art, steerer tube 42 is operatively connected with handlebars 28 within head tube 30. By way of this connection, steerer tube 42 is longitudinally locked within head tube 30 in a manner such that tube 42, and thereby front wheel 40, can still pivot relative to head tube 30 to allow cyclist 20 to turn bicycle 25.

Figure 2:
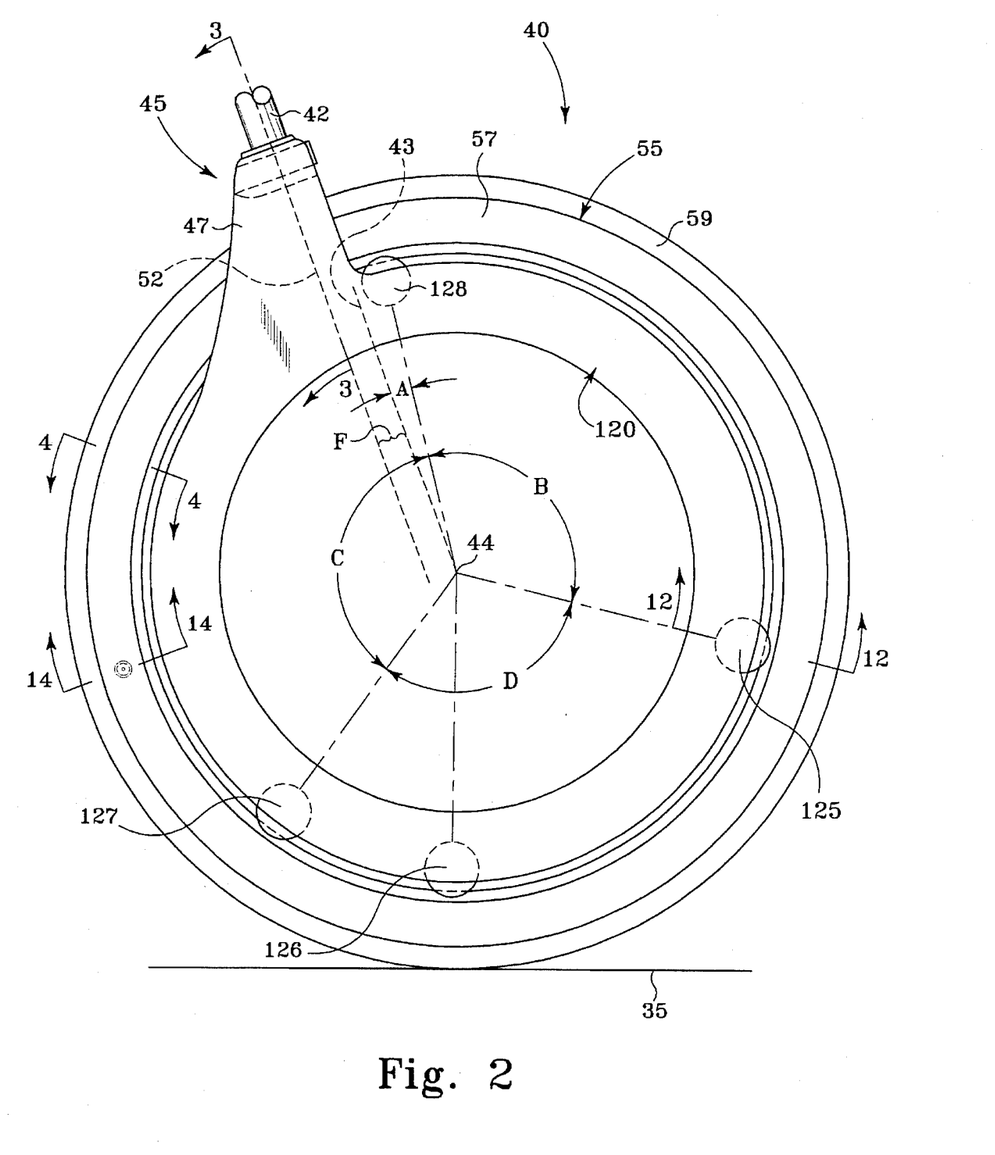
FIG. 2 is a side elevational view of the racing wheel of FIG. 1 detached from the bicycle.

For purposes of facilitating explanation, wheel 40 is shown in FIG. 2 removed from bicycle 25 and with brake 38 removed. Wheel 40 is similar in many respects to the hubless wheel disclosed in application Ser. No. 08/169,582, which is incorporated herein by reference. Wheel 40 basically comprises a bicycle attachment module 45, a rotationally fixed inner component 120 which is a symmetrical hoop or annular shaped in this embodiment, and a rotatable outer annular component 55. Inner hoop component 120 is attached to bicycle attachment module 45, and as a result component 120 does not revolve or otherwise experience rolling rotation during bicycle operation. Outer annular component 55, coupled with inner component 120 in a manner to be free to rotate relative thereto during operation, provides the ground engaging surface or tread of wheel 40. The type of ground engaging tread utilized is not material to the invention, and can range from standard pneumatic tubular or clincher tires to nubs or other radially extending ground engaging projections.

Figure 3:
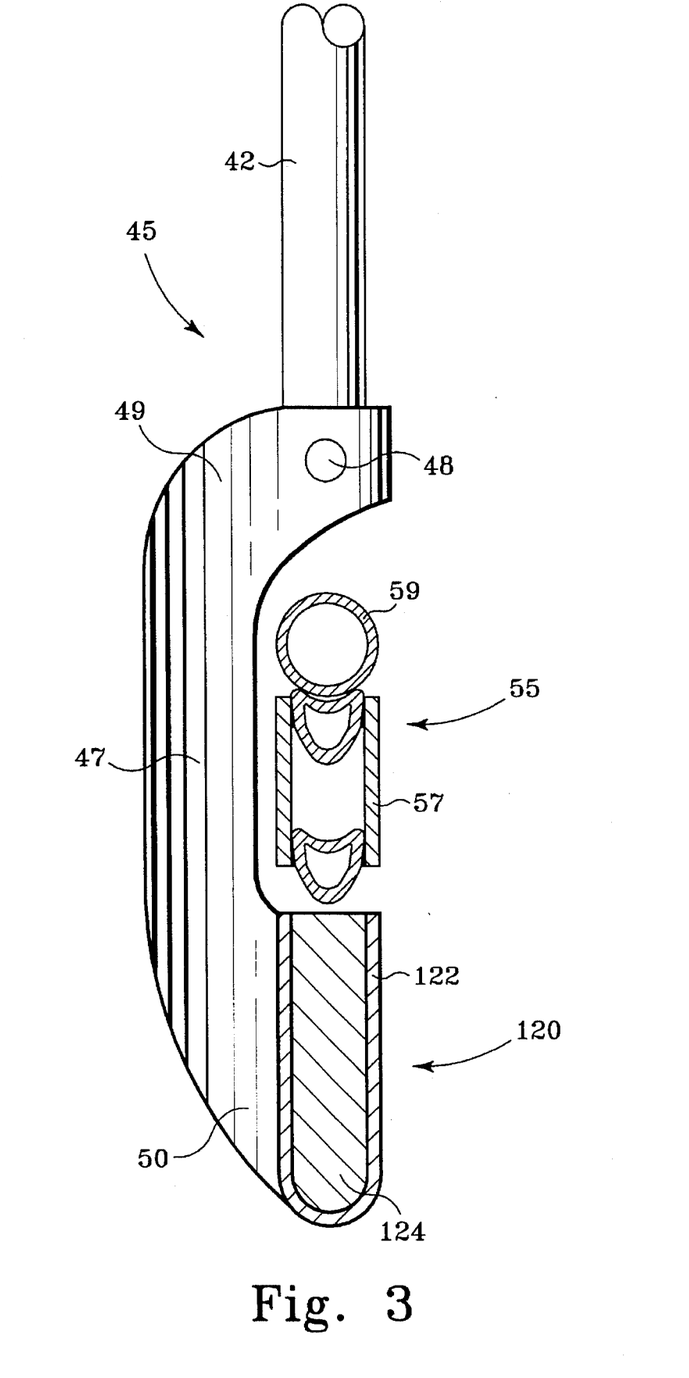
FIG. 3 is a radial partial cross-sectional view, taken along line 3—3 of FIG. 2, showing the inner component and outer component of the present invention in cross-section and showing the bicycle attachment module not in section.

Bicycle attachment module 45, best shown in FIGS. 2 and 3, includes a generally upwardly extending hollow steerer tube 42 and a curved stay 47. Steerer tube 42, made of a lightweight metal such as an aluminum alloy, is securely and non-rotationally attached to the outward end 49 of stay 47 and is structured to be slidably inserted into head tube 30. Stay 47 is preferably fabricated to include a lightweight carbon fiber composite shell with a low density core filling of the type described more fully below with respect to the construction of inner hoop component 120. Bore 48 extends through stay 47 and receives the spindle of brake 38 in the mounting of brake 38. At its inward end 50, stay 47 is securely attached to a portion of inner component 120, preferably by a chemical bond between their respective composite coatings. This chemical bond essentially involves pressing and maintaining together stay 47 and inner hoop component 120 when their respective composite coatings are not fully cured or hardened and letting these coatings bond with each other during curing. Alternative attachment techniques including mechanical fasteners such as screws are also feasible, but are less desirable due to their heavier weight.

It will be appreciated that different bicycles 25 may have head tubes 30 with different tilts or angular orientations with respect to vertical. It is within the scope of the invention for bicycle attachment module 45 to be mounted to inner component 120 at a number of angular locations as well as orientations around inner component 120, relative to the bearings described more fully below, in order to be received by these different head tubes 30. For example, steerer tube 42 may be attached to component 120 such that when wheel 40 is connected to bicycle 25 for use, tube 42 may be located either forward or rearward of the top center of wheel 40. In addition, tube 42 may be so attached in a variety of different orientations including where steerer tube longitudinal axis 52 is not parallel to any possible radial line extending from axis of rolling rotation 44. Moreover, bicycle attachment module 45 can be selectively located on inner component 120 to influence the handling characteristics of bicycle 25. For instance, in FIG. 2, attachment module 45 is mounted such that longitudinal axis 52 of steerer tube 42 is arranged rearwardly of and in spaced parallel relationship with zero trail line 43. The uniform distance or offset indicated as F, which normally ranges from 0 inches to about 3½ inches, provides wheel 40 with positive trail. The effect on bicycle handling is that larger positive trails, while realizing a slower turning response for bicycle 25, result in a more stable feel for bicycle 25.

Zero trail line 43 identified above is used herein as a reference line to facilitate one explanation of the preferred positions of the wheel bearings. As used throughout the specification, zero trail line 43 refers to an imaginary vertical line through the axial center of wheel 40 which is established when both steerer tube 42 is arranged with its longitudinal axis 52 either radially aligned or offset from a radial line, and when inner component 120 is arranged such that steerer tube 42 is vertically aligned. It will be appreciated that zero trail line 43 is therefore independent of the operational, tilted position of steerer tube 42 in wheel 40.

Figure 4:
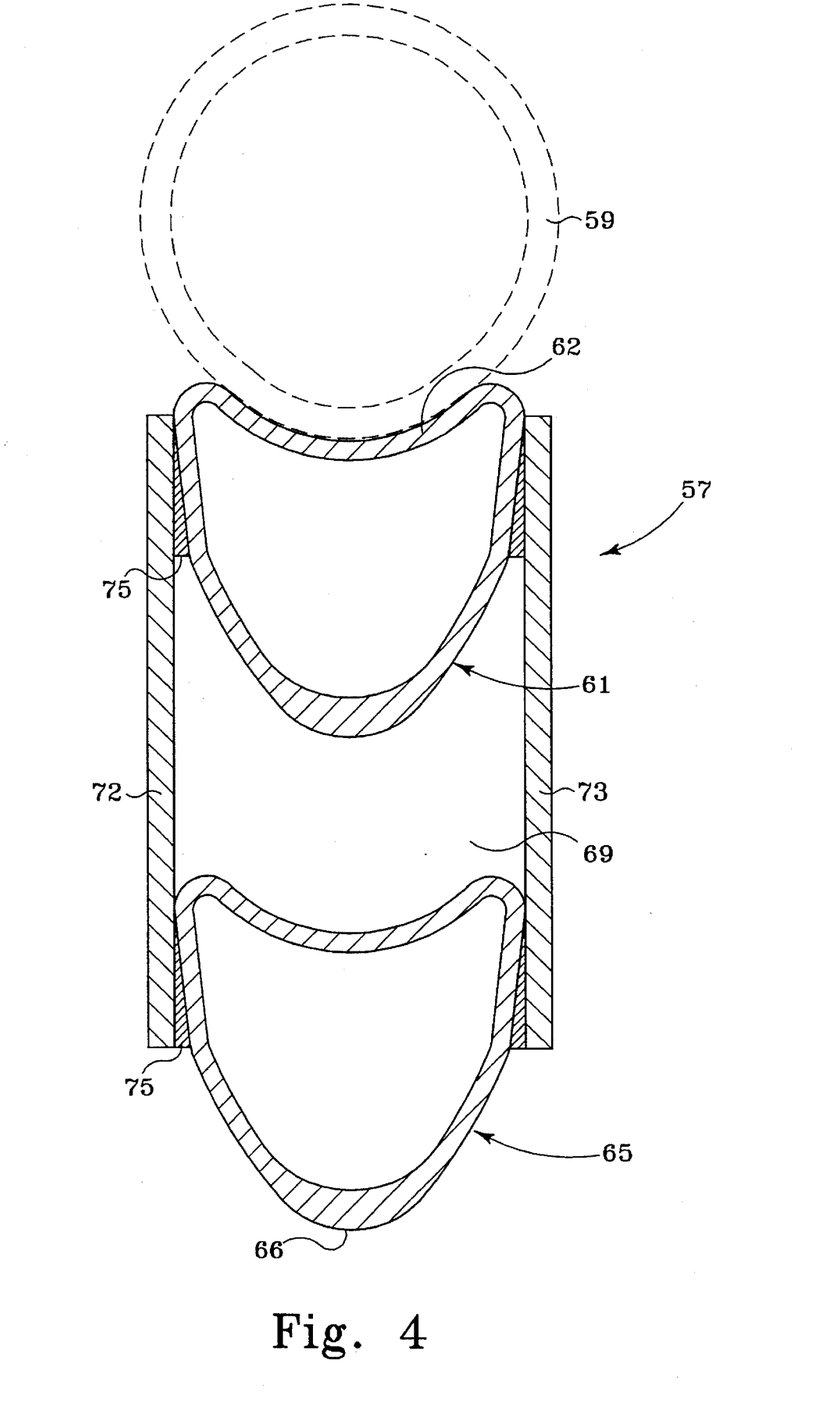
FIG. 4 is a radial cross-sectional view, taken along line 4—4 of FIG. 2, showing only a preferred construction of the outer hoop of the present invention and with the ground engaging tire shown in shadow.

Referring now to FIGS. 2–4, outer annular component 55 includes a circular outer hoop 57 and a ground engaging tread, preferably replaceable pneumatic tire 59, disposed circumferentially therearound. Except for a preferred valve assembly described more fully below, the construction of annular component 55 shown in cross-section in FIGS. 3 and 4 is representative of the entire component circumference. Outer hoop 57 may be fabricated by attaching together two concentric rims 61, 65 with opposing ring-shaped side segments 72, 73.

Referring to FIG. 4, rims 61, 65 are generally tubular in shape and preferably formed from a lightweight but strong metal material such as aluminum. Other materials may also be used, such as titanium, steel, magnesium or a metal matrix, as well as a metal-ceramic composition. While shown being identically formed in cross-section, this common configuration of rims 61, 65 is not necessary to a proper functioning of the present invention. Rather, the common configuration advantageously allows a single type of formed or extruded material to be fashioned into differently sized circular shapes which can be concentrically aligned. The radially outward surface 62 of outer rim 61 is radially concave to provide a slight recess to receive a tubular type pneumatic tire 59, which is attachable to outward surface 62 with one of many available types of tacky glue substances known in the art. The radially inward surface 66 of inner rim 65 is also radially concave to provide a preferred bearing engaging surface of outer component 55.

Side segments 72, 73, which span rims 61, 65 around the entire wheel circumference, form a thin skin which encloses a hollow hoop interior 69 between rims 61, 65. Side segments 72, 73 are formed of a lightweight but strong and rigid composite material. Representative composites include reinforcement fabric such as fibers of carbon, boron, glass, nylon or kevlar™ which can be formed and hardened into a desired shape with an epoxy resin or thermoplastic material.

Side segments 72, 73 are preferably a composite material of woven carbon fiber fabric coated or combined with an epoxy resin. A thickness of carbon fiber fabric weighing around 15.84 ounces (450 grams) per square yard is used for side segments 72, 73. For side segments 72, 73, a bi-directional fiber weave is preferred to withstand expected stresses on outer hoop 57. This fabric thickness can be provided as a relatively heavy weave, or can be suitably provided by laminating multiple layers together with epoxy resin, for example four layers of carbon fiber fabric weighing about 4.32 ounces per square yard. A suitable carbon fiber fabric is available from Advanced Composites Group, Inc. of Owasso, Okla. The preferred hardening epoxy resin, which can be selected from numerous coatings capable of stiffening items such as fibrous fabrics, is available from Ad-Tech of Charlotte, Mich. and identified by the manufacturer as EL-301. EL-301 can be mixed and applied to the untreated fabric by a manufacturer of outer hoop 57 in a manner described in application Ser. No. 08/169,582, or can be combined with the above carbon fiber fabric by another, such as Advanced Composites Group, Inc., to form a prepreg type material to facilitate wheel manufacture.

Thermoplastic composites, which are available from Quadrax Advanced Materials Systems, Inc. of Portsmouth, R.I. and which can be used in making wheel 40, are fabricated as a commingled yarn system. In particular, strands of thermoplastic material are interwoven with fibers such as carbon or kevlar™ fibers to form such a composite. Upon being heated to sufficiently high temperatures, these thermoplastic composites are flexible and shapable and can be formed into a desired shape, such as side segments 72, 73 or inner hoop 120 described below. When cooled, the desired shape is rigidly retained.

The composite side segments 72, 73 are securely attached to both rims 61, 65, preferably with adhesives 75. A suitable adhesive is known as Hysol 3000 Series Epoxy, available from Dexter Aerospace Materials of Pittsburg, Calif.

Figure 5:
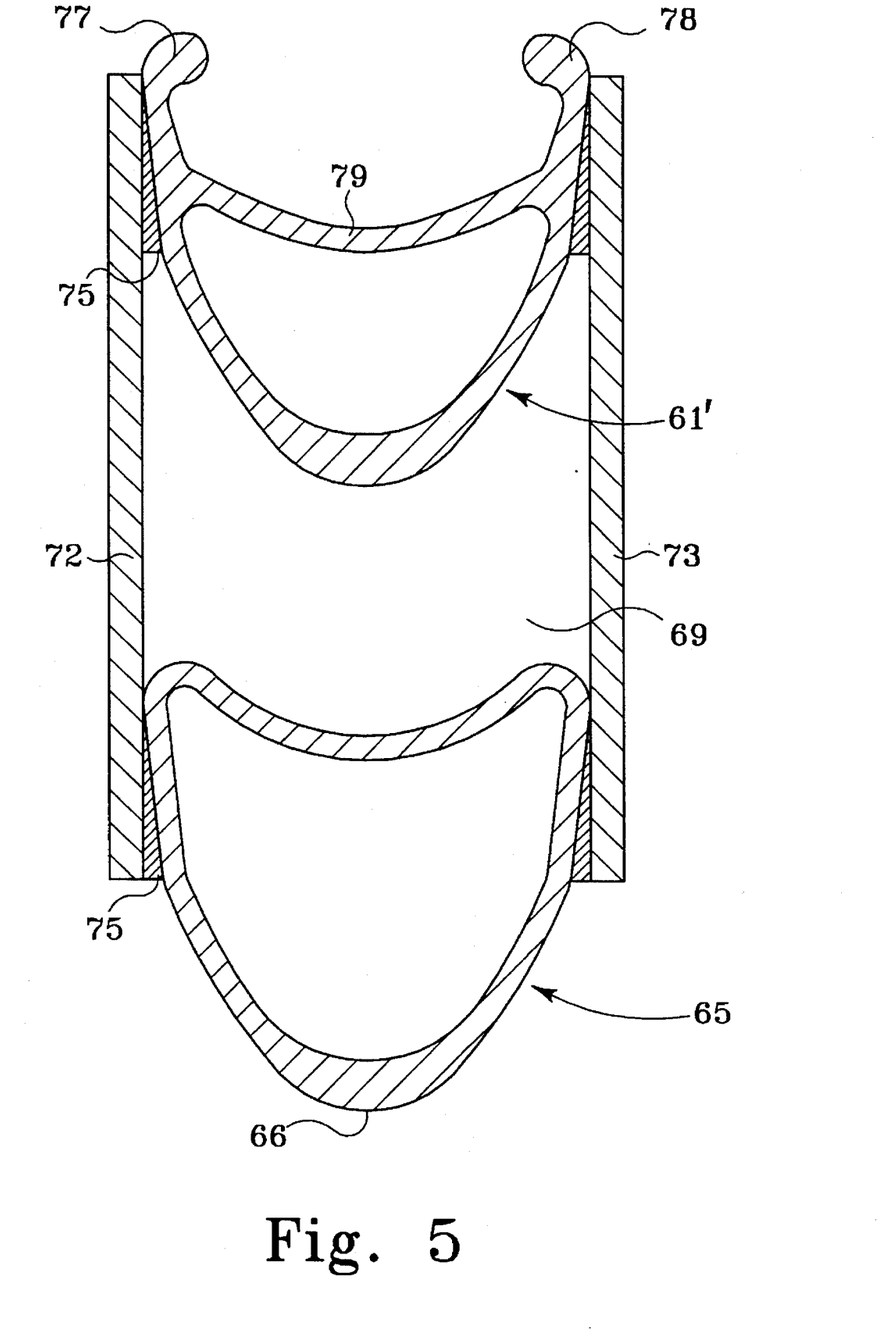
FIGS. 5–11 are radial cross-sectional views, conceptually taken along the line 4—4 of FIG. 2, showing various alternate outer hoop constructions.

Several alternate embodiments of outer hoop 57, shown in radial cross-section as conceptually taken along the line 4—4 of FIG. 2, are shown in FIGS. 5–11 and provide lightweight hoops. In FIG. 5, the outer hoop is identical to outer hoop 57 of FIG. 4 except that outer rim 61' is shaped to accommodate a clincher tire known in the art rather than a tubular tire. As a result, outer rim 61' includes lipped flanges 77, 78 which radially project outward from radially concave outward surface 79 which support the tire.

Figure 6:
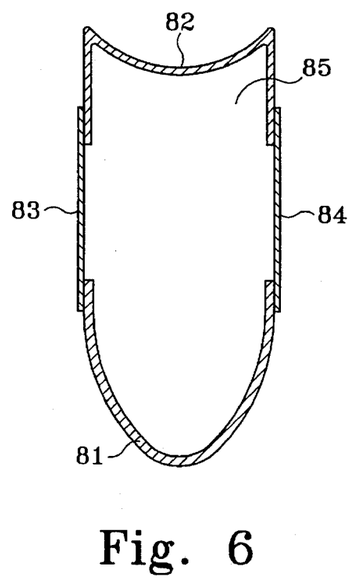
Figure 7:
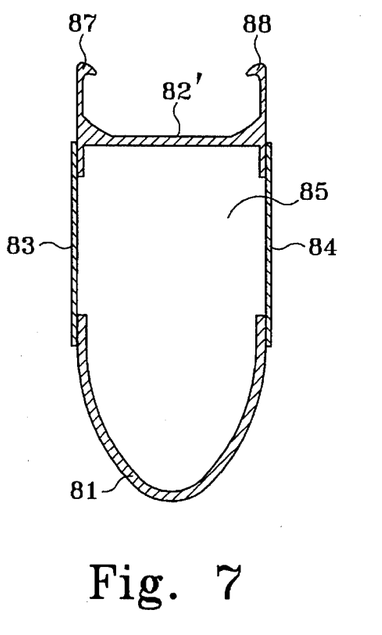

In FIG. 6, the outer hoop is formed with a substantially U-shaped, radially inward bearing engaging member 81 and a radially outward tubular tire receiving member 82. Hoop members 81, 82 are made of a suitable, wear resistant material such as metal and fixedly connected together by composite side segments 83, 84, which are attached with adhesives. Interior 85 of this outer hoop may be hollow, i.e. air filled, or filled with a low density material described more fully below to impart increased strength to the hoop without a large increase in weight. The outer hoop in FIG. 7 is structurally identical to the hoop of FIG. 6 except that radially outward tire receiving member 82' includes lipped flanges 87, 88 to accommodate a clincher tire.

Figure 8:
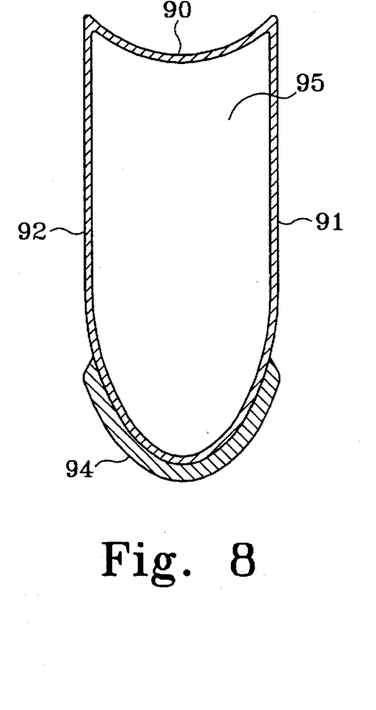
Figure 9:
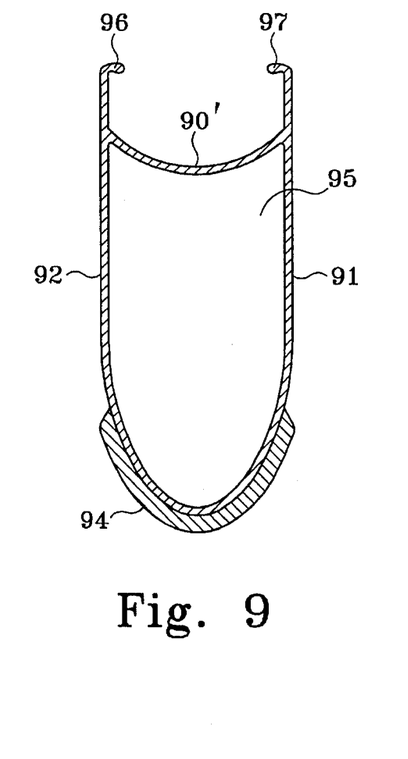

In FIG. 8, the shell of the outer hoop is formed from a composite with a radially outward tubular tire receiving segment 90, axial sides 91, 92, and a radially inward region to which is adhesively attached a bearing engaging strip 94. Strip 94 is made of a durable metal such as a hard anodized aluminum alloy and prevents the composite shell from being worn away by contact with the preferred rotating bearings described below. Interior 95 of this outer hoop may be hollow, i.e. air filled, or filled with a low density material. The outer hoop in FIG. 9 is structurally identical to the hoop component of FIG. 8 except that it functions with a clincher tire, and therefore composite lipped flanges 96, 97 are formed to radially project from radially outward tire receiving segment 90'.

Figure 10:
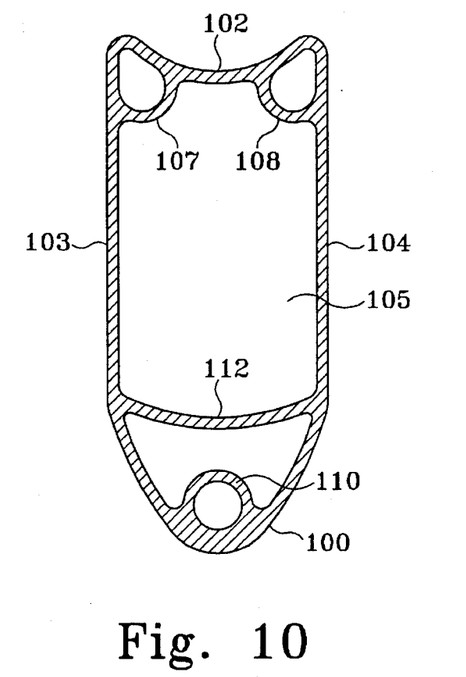
Figure 11:
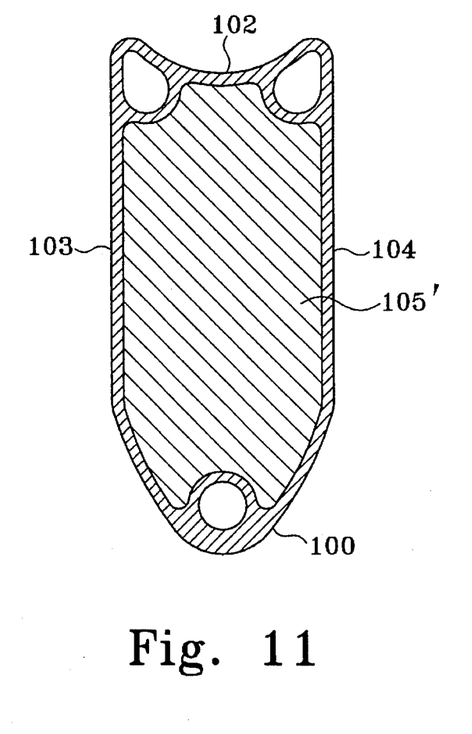

In FIG. 10 and 11, additional alternate designs for outer hoop 57 to be used with a tubular tire are shown. These variants are particularly designed to be fabricated in one-piece from aluminum or a metal matrix. In FIG. 10, the outer hoop is formed with a substantially U-shaped radially inward bearing engaging surface 100, a radially outward and concave tire receiving surface 102, and axial sides 103, 104. Interior 105 is intended to be hollow or air filled. To provide increased strength and rigidity, arc shaped ribs 107, 108 are formed between tire receiving surface 102 and axial sides 103, 104 respectively, semi-circular rib 110 is formed within the concavity of bearing engaging surface 100, and axial rib 112 spans axial sides 103, 104. The outer hoop component of FIG. 11 is identical to that of FIG. 10 except that axial rib 112 is removed and hoop interior 105' is filled with a low density filling to impart desired rigidity.

Referring now to FIGS. 2–3, inner component 120 is shown being annular in shape and with abstractly shown bearings disposed at selected locations around the hoop circumference. Inner hoop component 120 is concentric with outer hoop 57, and therefore the central axis of inner component 120 is also the axis of rolling rotation 44 for wheel 40. As shown in FIG. 3, inner component 120 is formed with a generally bullet shape in cross-section shell 122, preferably made of a lightweight composite material. A preferred composite is a uni-directionally woven carbon fiber fabric, having the same thickness as the composites of outer hoop 57, hardened with an epoxy resin. Radially thicker inner hoops may be more aerodynamic. For instance, for a hoop 120 having an outer radius of about 9.5 inches, an inner radius of about 7.250 inches for the shown cross-section provides better aerodynamic properties than an inner radius of about 8.0 inches. Alternate aerodynamic constructions including a construction being more sharply V-shaped are within the scope of the invention. Although shell 122 is not shown extending around the radially outward surface of inner hoop component 120, shell 122 could be so configured within the scope of the invention. To provide increased strength, interior or core 124 of inner component 120 is preferably filled with a low density material, such as a closed cell foam material. A preferred core foam filling known as Foam is available from Foam Services Industry of St. Louis, Mo. and is a two part mixture of Diphenyl Methane #4 and 4-Diisocyanate which are mixed in equal parts by volume. This filling is poured or injected in liquid form into a mold with shell 122 after shell 122 is formed, and the liquid hardens to form the low density solid core. As used herein, low density refers to a density of ten pounds or less per cubic foot. A variety of other low density materials, such as aluminum honeycomb or NOMEX™ honeycomb, as well as balsa wood, may be substituted for the foam core.

Radially extending beyond the outer radial periphery of inner hoop component 120 are bearings 125–128, which facilitate relative rotation between outer component 55 and inner hoop component 120. In the preferred embodiment, lower bearings 125–127 are identically constructed and are mounted in a common fashion. Consequently, the following explanation with reference to FIG. 12, which is a radial cross-sectional view of bearing 125 taken along line 12—12 in FIG. 2, has equal application to bearings 126, 127. Bearing 125 is positioned in a hollow 130 formed during core 124 formation or carved thereafter into foam core 124. Bearing 125 includes an annular sleeve 131 having an outer radial periphery 132 and an inner radial shoulder 134. Radial periphery 132 is a support surface contoured to operatively engage radially inward surface 66 of inner rim 65 during wheel usage. This contact or engagement provides both radial support and axial support to outer annular component 55. As shown, in the preferred embodiment support surface 132 has a radially convex curved shape. Annular sleeve 131 is preferably made of Delrin-AF or Delrin 500CL plastic, available from DuPont, in order to provide low friction rolling contact with surface 66.

Figure 12:
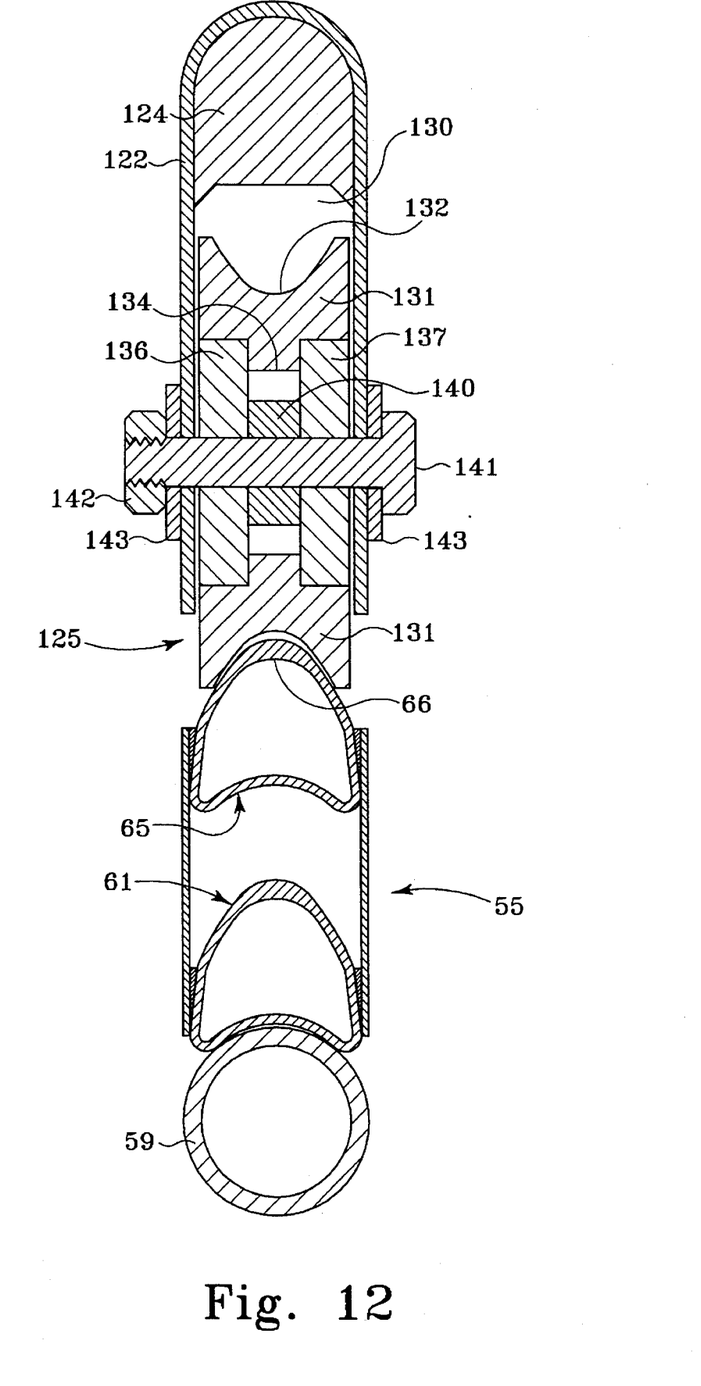
FIG. 12 is a radial cross-sectional view, taken along line 12—12 of FIG. 2, showing the inner hoop and outer hoop being operatively connected by a preferred bearing of the present invention.

Bearing 125 also includes a pair of ball bearing type bearings 136, 137 which are simply shown in solid cross section in FIG. 12. Bearings 136, 137 are spaced by an annular spacer 140 disposed therebetween and by annular sleeve shoulder 134. Axially extending bolt 141 serves as the axle for bearing 125. Bolt 141, which is secured by nut 142, passes through metal washers or hard points 143 flanking inner hoop shell 122 that distribute the loads to the composite shell. Washers 143 may be connected to shell 122 during composite curing, or alternatively connected after curing by use of an adhesive. It will be appreciated that various other support surfaces of the bearings, including radially convex designs as well as other examples specified in application Ser. No. 08/169,582, can be utilized provided corresponding changes in the shape of radially inward surface 66 of inner rim 65 are made.

Figure 13:
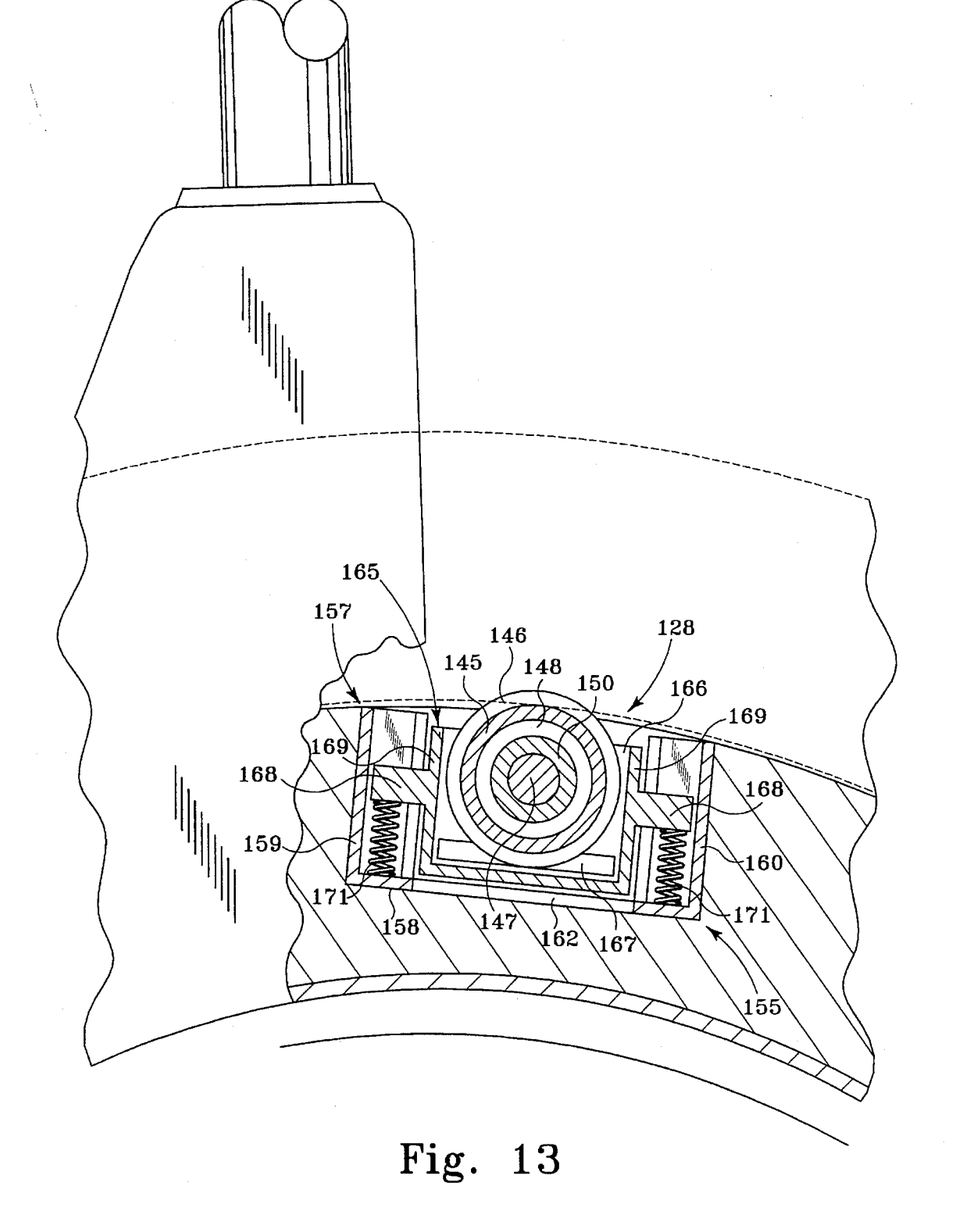
FIG. 13 is a side view in partial cross-section showing a passive suspension system of the present invention in an upper segment of the inner component, wherein the outer component is shown in shadow.

A preferred configuration of bearing 128, which is mounted proximate the top of wheel 40, is shown in partial cross-section in FIG. 13. Bearing 128 is constructed similar to bearings 125–127, and includes an annular sleeve 145 rotatably mounted to an axle 147 via ball bearing type bearings 148 spaced by spacer 150. Annular sleeve 145 has a radial periphery 146 contoured to engage inner rim inward surface 66. Because upper bearing 128 primarily experiences only lateral or axial forces and not the significant radial forces experienced by bearings 125–127, annular sleeve 145 may be radially thinner than bearing sleeves 131.

Although bearing 128 may be mounted to inner component 120 in a similar fashion as bearings 125–127, a preferred embodiment of a suspension system which mounts bearing 128 is shown in partial cross-section in FIG. 13, wherein outer component 55 is diagrammatically shown in shadow. The suspension system, generally designated 155, includes carriage 157 and slider 165. Carriage 157 has a planar bottom wall 158 attached to a pair of opposing guide channels 159, 160, which are each generally C-shaped in horizontal cross-section. It will be appreciated that in FIG. 13 the foreground halves of C-shaped channels 159, 160 are removed for purposes of the cross-sectional illustration. Bottom wall 158 is formed with a central aperture 162, and guide channels 159, 160 are formed freestanding, such that carriage 157 has a minimal amount of solid mass and therefore weight. Carriage 157 resides within a hollow carved out from inner core 124 and is preferably adhesively connected to the exposed surfaces of core 124. Alternatively, carriage 157 can be fastened to core 124 or composite shell 122 of inner component 120 with mechanical fasteners.

Slider 165 is generally parallelepiped in shape, and slider side walls 166 receive axle 147 therethrough to mount bearing 128 in a freely rotatable manner within an interior cavity defined by sides walls 166 and end walls 169. Apertures 167 provided in side walls 166 reduce the weight of slider 165. Ears 168, sized to closely fit within the interior volume defined by guide channels 159, 160, extend longitudinally from end walls 169. Disposed within each C-shaped guide channel 159, 160 between carriage bottom wall 158 and the bottom surface of slider ears 168 are biasing devices 171. Although shown as being helical compression springs in form, biasing devices 171 can be other types of springs or bumpers or elastomeric materials resistant to deformation.

It will be appreciated that when the outer hoop 57 is operationally aligned relative to inner component 120, springs 171 of passive suspension system 155 bias roller 128 into contact with outer hoop bearing engaging surface 66 and keeps bearing 128 in rolling contact with surface 66 during operation. Any deviation from a true circular configuration of outer hoop 57, which absent a suspension system could allow outer hoop 57 to slightly separate from bearing 128, is accounted for by suspension system 155. As a result, roller 128 retains its ability to provide lateral forces to outer component 55 and thereby continuously maintains component 55 in alignment with inner component 120. It will be appreciated that the passive suspension system 155 as shown and described is merely a preferred manner of maintaining upper roller 128 in rolling contact with outer hoop 55 during operation. For instance, a spring interposed between inner core 124 or shell 122 and bearing axle 147 could be utilized to achieve this function. In addition, alternatively configured carriages and sliders in combination may be employed.

It is within the scope of the invention for bearings to be disposed at various locations around inner component 120, to be types or configurations different from the described rotating rollers, and to be configured to provide merely radial or axial hoop support, such as taught in application Ser. No. 8/169,582. Different numbers of the shown bearings can also be employed to reduce friction between rotating outer component 55 and rotatably stationary inner component 120. The presently preferred bearing arrangement, best illustrated in FIG. 2, utilizes four rotating bearings, namely bearings 125–128, to achieve smooth wheel rotation. The rotational axis of upper bearing 128 may be positionally identified relative to a line conventionally considered to be at 12 o'clock in a wheel side view, or in other words located relative to a vertical line (not shown) passing through axis of rolling rotation 44 when wheel 40 is passing over a horizontal support surface. It will be appreciated that the verticality of this line is a consequence of the horizontal ground, and this line can alternately be described as a line, passing through axis of rolling rotation 44, which is perpendicular to the contact area of ground 35 with tire 59. Upper bearing 128 is preferably located at an angular location along inner hoop component 120 rearward of this vertical radial line. As used herein, forward refers to the typical direction of travel of bicycle 25. This rearward angle at which bearing 128 is located is within the range of about 10° to 23°, more preferably in the range of about 10° to 16°, and even more preferably is about 10°. Lower bearing 125 is located at an angular location, represented by angle B in FIG. 2, forward of the angular location of upper bearing 128. Angle B is within the range of about 100° to 130°, more preferably in the range of about 110° to 120°, and even more preferably is about 115°. Lower bearing 127 is located at an angular location, represented by angle C in FIG. 2, rearward of the angular location of upper bearing 128. Angle C is within the range of about 105° to 135°, more preferably in the range of about 115° to 125°, and even more preferably is about 120°. Bearing 126 is located along inner component 120 between bearings 125, 127, or in other words within the obtuse angle D formed by bearings 125, 127 and axis of rolling rotation 44. More particularly, bearing 126 is located so as to be aligned above the contact patch of tire 59 with ground 35, such that the radial line extending through the rotational axis of bearing 126 will be substantially perpendicular to ground 35 over which wheel 40 is passing. While it is preferred that bearing 126 be located directly above the ground contact patch, slight forward or rearward angular offsets of up to about 10° are possible but are not preferred as they lessen performance.

Another manner of describing the preferred bearing location is with reference to zero trail line 43. For the presently preferred combined configuration of bicycle 25 and wheel 40 represented in FIG. 2, steerer tube 42 is oriented with an offset F of 0.79 inches (20 millimeters) and located for use with a 74° head tube 30, or in other words tube 42 is oriented 16° from vertical. The rotational axis of upper bearing 128 is located at an angular location along inner hoop component 120, represented by angle A in FIG. 2, forward of zero trail line 43. For this configuration, angle A is within the range of about −7° to 6°, more preferably in the range of about 0° to 6°, and even more preferably is about 6°. Lower bearings 125, 126, and 127 are identically located with respect to bearing 128 as described above.

The precise locations of bearings 125–128 will be further understood in view of the following description of how the positions on inner component 120 for the bearings may be determined during wheel 40 construction. With reference to the description of the bearing locations relative to the vertical line through axis of rolling rotation 44, inner component 120, with its steerer tube 42 fixedly attached thereto or held in a finished position, is rotated until steerer tube 42 is operationally aligned for engagement with head tube 30. A hole through inner hoop component 120 in which axle 147 of bearing 128 inserts is then drilled or otherwise formed at a selected angular location relative to the vertical line, preferably about 10° rearward thereof.

A hole for axle 141 of bearing 125 is then provided through inner hoop component 120 at an angular location as measured forward from bearing 128 through selected angle B. A hole for axle 141 of bearing 127 is then provided through inner hoop component 120 at an angular location as measured rearward from bearing 128 through selected angle C. A hole for bearing axle 141 of bearing 126 is then provided through inner component 120 preferably vertically below axis of rolling rotation 44, i.e. along the vertical line.

To provide the bearings at locations relative to zero trail line 43 for the illustrated embodiment, and with reference to a horizontal floor or ground, constructed inner hoop 120 is arranged perpendicular to the floor and such that steerer tube 42 of bicycle attachment module 45, either fixedly attached to inner hoop 120 or held in a finished position with respect to hoop 120, will be vertically aligned. It will be appreciated that even though provided with an offset F as described herein, steerer tube 42 can be so aligned. An imaginary vertical line passing through the axis of rolling rotation 44 is zero trail line 43. A hole through inner hoop component 120 in which axle 147 of bearing 128 inserts is then drilled or otherwise formed at a selected angular location relative to zero trail line 43, preferably about 6° forward of zero trail line 43.

A hole for axle 141 of bearing 125 is then provided through inner hoop component 120 at an angular location as measured forward from bearing 128 through selected angle B. A hole for axle 141 of bearing 127 is then provided through inner hoop component 120 at an angular location as measured rearward from bearing 128 through selected angle C.

The hole for axle 141 of bearing 126 is a function of the tilted orientation of head tube 30. If wheel 40 were to be used with a bicycle 25 having head tube 30 perpendicular to ground 35, it will be appreciated that tire 59 would contact ground 35 along zero trail line 43, and therefore bearing 126 would preferably be mounted along zero trail line 43. As head tube 30 is frequently tilted from vertical toward cyclist 20 as shown in FIG. 1, the ground contact patch will be rearward of zero trail line 43 and bearing 126 should be moved accordingly. A preferred method of identifying the proper bearing location begins by rotating inner hoop 120 around its central axis until steerer tube 42 of bicycle attachment module 45, which is still either finally attached to inner hoop 120 or held in the finished position, is rotated to be tilted at the expected vertical tilt of head tube 30, such as the 16° tilt described above. A hole for bearing axle 141 of bearing 126 is then provided through inner component 120 preferably vertically below axis of rolling rotation 44.

Figure 14:
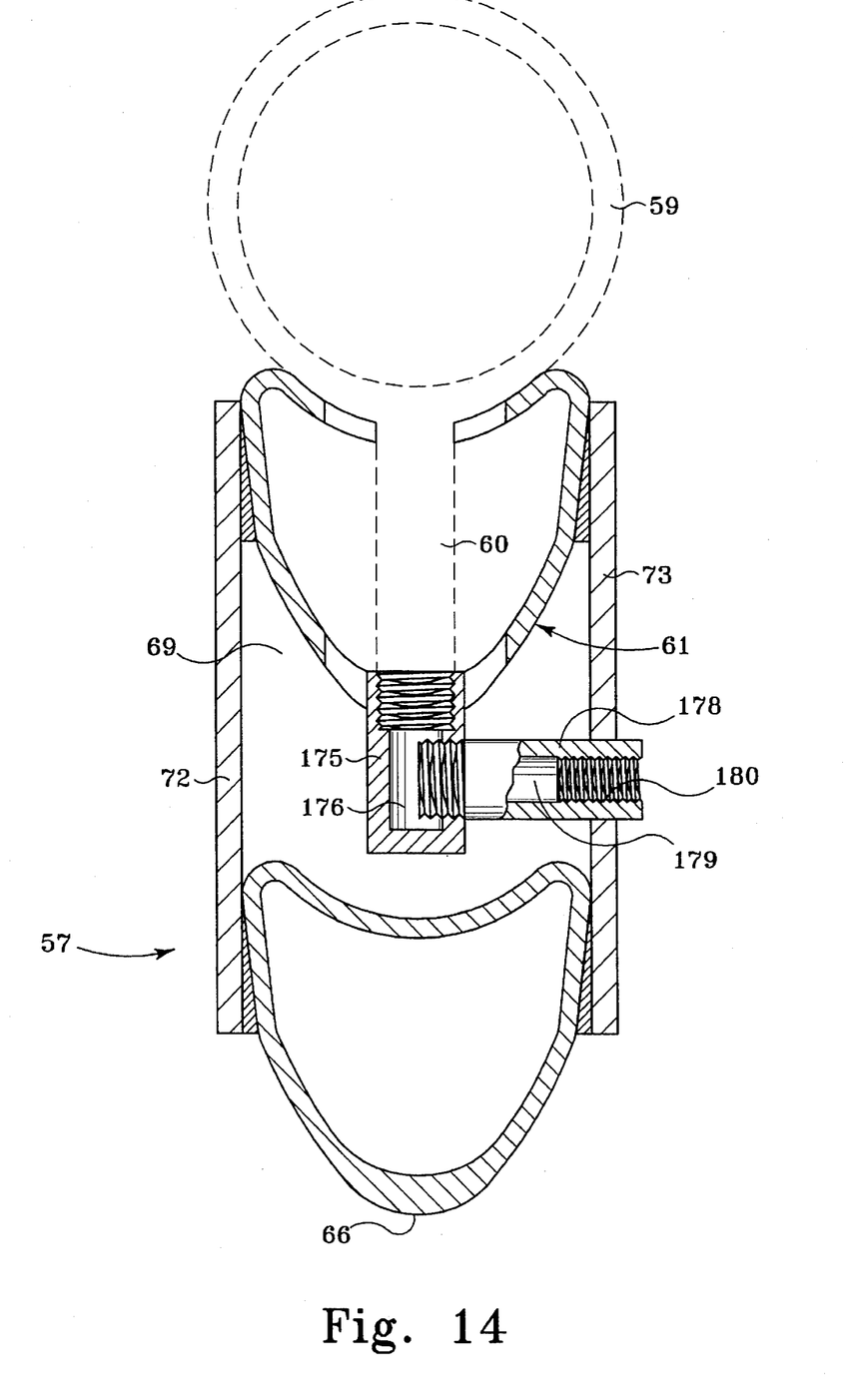
FIG. 14 is a radial, partial cross-sectional view, taken along line 14—14 of FIG. 2, showing an inflation valve assembly of the present invention within the outer hoop.

Referring now to FIG. 14, there is shown a partial cross-sectional view, taken through line 14—14 of FIG. 2, showing an assembly for accommodating inflation valves of standard bicycle wheels. It will be appreciated that existing bicycle wheels typically have inflation valve stems which extend radially inwardly from the pneumatic tire. Due to the invention design utilizing an outer hoop 57 deeper than conventional rims as well as because radially inward surface 66 of inner rim 65 serves as a bearing engaging surface, it is desirable to move the effective inlet for the inflation valve. Otherwise, the inflation valve or stem might protrude radially inward and interfere with bearings 125–128, or alternatively might be so short as to end within hollow interior 69. As shown in shadow, tire 59 includes inflation valve stem 60 which projects through a hole formed in outer rim 61. Tire 59 is a type of tire known in the art which has a core air valve (not shown) removably located within valve stem 60. Valve stem 60 is shown threadably received by a cylindrical, upper plug 175 which is radially aligned and which includes air passageway 176. The core air valve has already been removed from stem 60. A threaded lateral bore in plug 175 threadedly connects to a second cylindrical plug 178 having an axial air passageway 179. The core valve is threaded into an internally threaded section 180 of passageway 179. Plug 178 extends through a port formed in the composite side segment 73 of outer hoop 57, thereby allowing a person access to the core valve to adjust the air pressure of tire 59. The shown orientation of plug 178 achieves a 90° elbow in the effective length of inflation valve stem 60. Rather than a 90° elbow, other angles down to about 30° can be used. Rather than the multiple parts shown, in an alternate design the inflation valve stem elbow may be formed as a single part. Alternatively, bicycle manufacturers may provide an angled valve stem to accommodate racing wheel 40.

Figure 15:
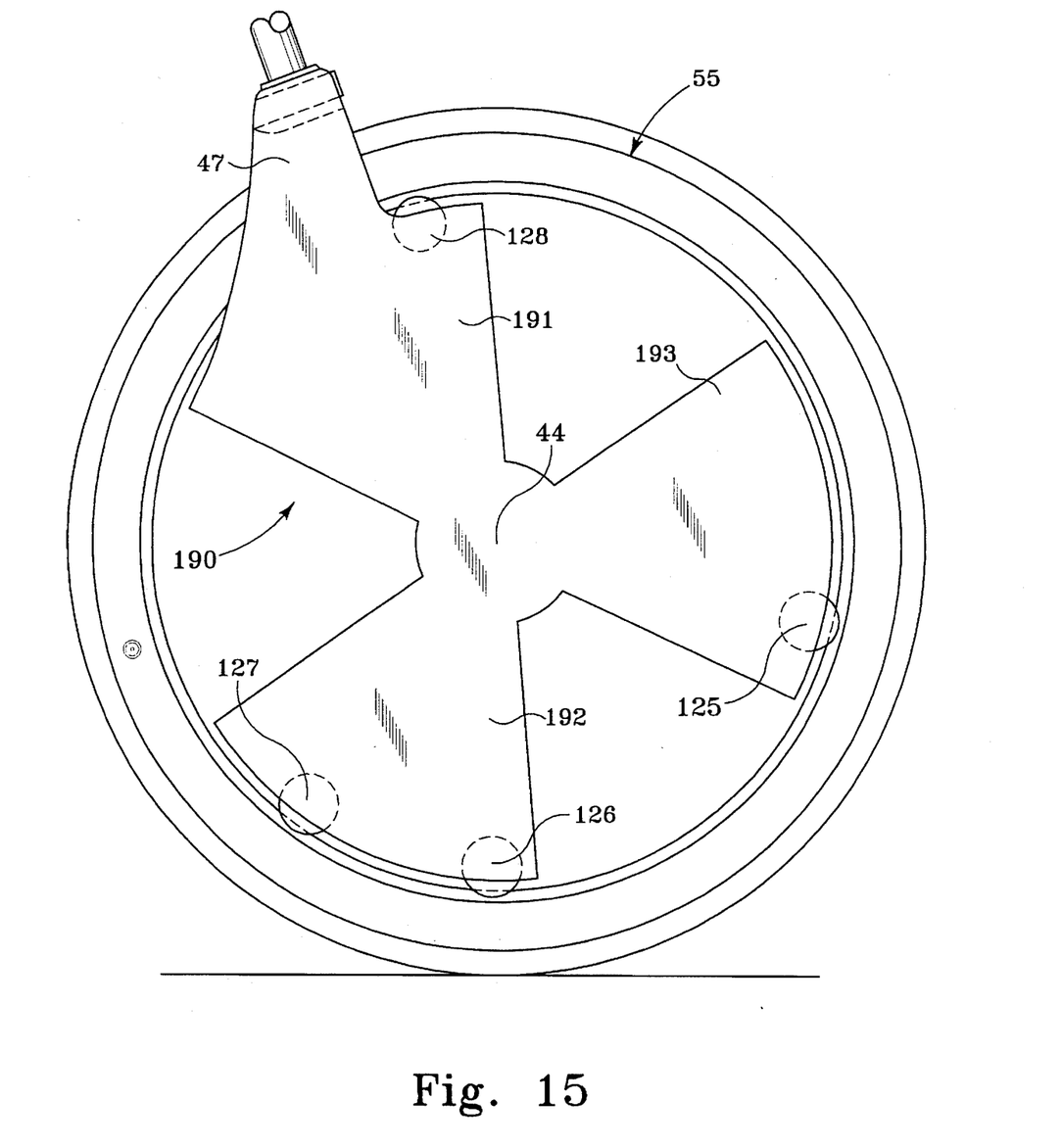
FIG. 15 is a side elevational view of an alternate embodiment of the racing wheel of the present invention detached from the bicycle.

Referring now to FIG. 15, there is shown a side view of an alternate construction of the racing wheel of the present invention. In this embodiment, all of the parts other than inner hoop component 120 are identical to the embodiment of racing wheel 40 illustrated in FIG. 2. Therefore, corresponding parts are correspondingly numbered. In this embodiment, inner component 190 consists of three rotationally stationary spokes 191–193 which radially converge at axis of rolling rotation 44. Upper bearing 128 is mounted within spoke 191, lower bearings 126, 127 are mounted within spoke 192, and lower bearing 125 is mounted within spoke 193. Stay 47 is attached to spoke 191. The spokes can be formed of various materials, such as a composite filled with a low density material, and can be angularly spaced at constant or different intervals.

Rather than the tri-spoke design illustrated, other configurations of the inner component are considered within the scope of the invention. For instance, the inner component could be a rotationally stationary tubular polygon in shape, with the various segments of the polygon providing for the mounting of bearings 125–128 in any selected location. In addition, additional spokes could be employed, or the inner component could be a disc. It will be appreciated by those of skill in the art that a variety of other configurations can be advantageously utilized to achieve a wheel with beneficial aerodynamic and weight characteristics.

Figure 16:
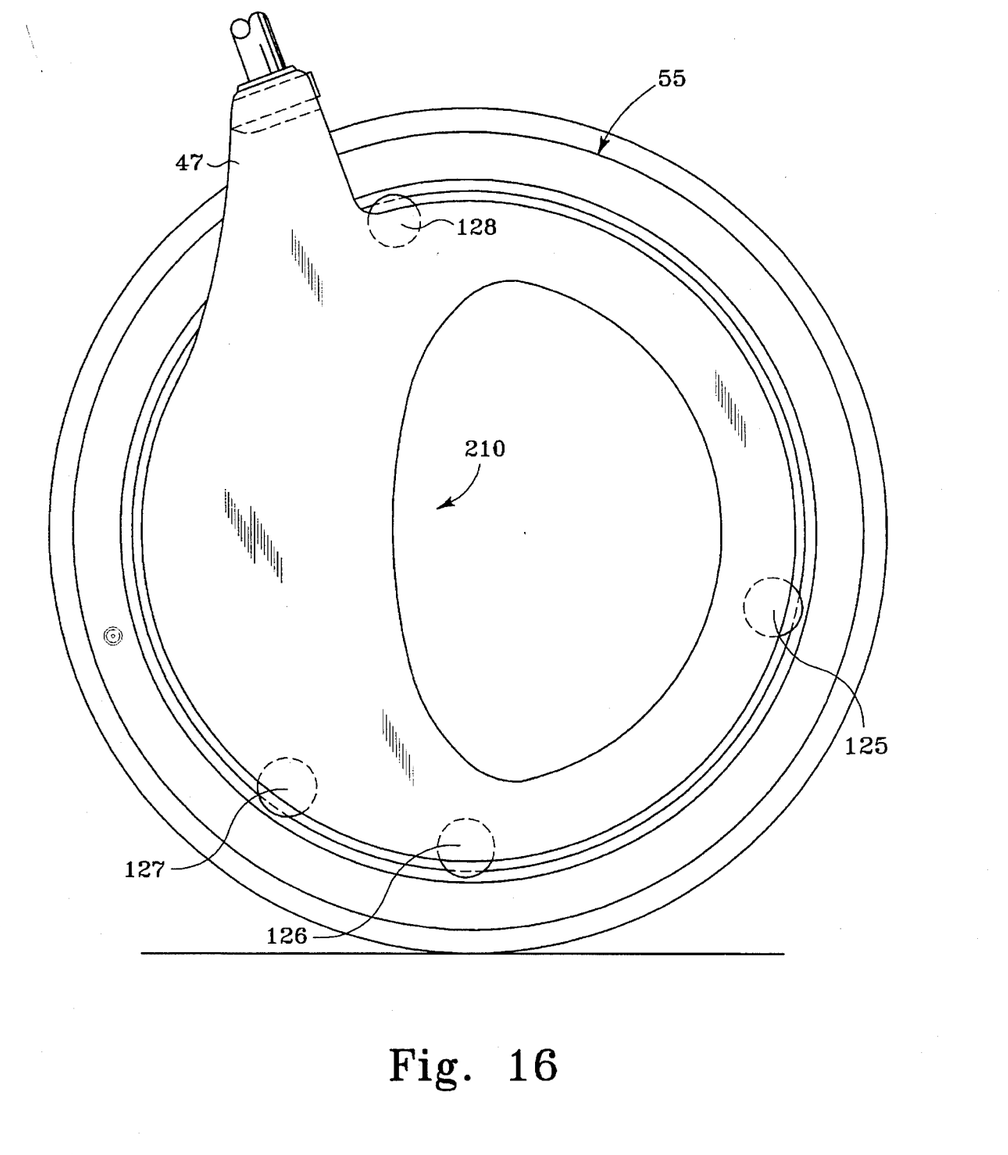
FIG. 16 is a side elevational view of still another alternate embodiment of the racing wheel of the present invention detached from the bicycle.

Referring now to FIG. 16, there is shown a side view of still another alternate construction of the racing wheel of the present invention. In this embodiment, all of the parts other than inner hoop component 120 are identical to the embodiment of racing wheel 40 illustrated in FIG. 2. Therefore, corresponding parts are correspondingly numbered. In this embodiment, inner component 210 consists of an asymmetrical inner hoop, constructed similarly to the inner hoop of racing wheel 40, which is considered to be generally concentric with annular component 55 despite having an offset aperture. Inner component 210 is of the most advantage in higher speed uses. Asymmetrical inner hoop component 210 utilizes a generally D-shaped aperture positioned proximate the leading region of the wheel interior to provide a more rigid and stable wheel than racing wheel 40. In particular, by making the inner hoop component asymmetrical to fill the trailing region of the wheel radial interior, a stiffer wheel results. In addition, the specific asymmetry of the inner hoop may enhance wheel stability and handling in cross winds. With respect to an imaginary line which generally extends from the contact point of the wheel with the ground and the attachment to the handlebars, the extra laterally facing surface area provided by asymmetrical inner hoop component 210 substantially equalizes the surface area of inner hoop 210 trailing this imaginary line with that surface area of inner hoop 210 leading this imaginary line. It will be appreciated that with the symmetrical inner hoop of FIG. 2, the surface area leading this imaginary line is greater than the surface area trailing this imaginary line. Consequently, when exposed to a cross wind, the wheel of FIG. 2 therefore experiences wind forces on the inner hoop which generate twisting forces around this imaginary line that adversely affecting steering. With the asymmetrical inner hoop design shown, these twisting forces on the wheel possibly resulting from cross winds are advantageously avoided.

While this invention has been described as having a number of preferred designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A wheel for a bicycle movable in a forward direction over a horizontal support surface, the wheel comprising:

a rotationally stationary inner component connectable to the bicycle;

a rotatable outer hoop comprising a bearing engaging surface and an axis of rolling rotation, wherein said outer hoop is concentric with said inner component;

a ground engaging tread disposed on said outer hoop;

a first bearing mounted on said inner component to be rotationally stationary therewith, said first bearing being operationally positioned around said inner component at an angular location between about 10° and 23° rearward of a vertical line passing through said axis of rolling rotation;

a second bearing mounted on said inner component to be rotationally stationary therewith, said second bearing being operationally positioned around said inner component at an angular location between about 100° and 130° forward of said first bearing;

a third bearing mounted on said inner component to be rotationally stationary therewith, said third bearing being operationally positioned around said inner component at an angular location between about 105° and 135° rearward of said first bearing; and a fourth bearing mounted on said inner component to be rotationally stationary therewith, said fourth bearing being operationally positioned around said inner component at an angular location within an obtuse angle between said second bearing, said axis of rolling rotation, and said third bearing.

2. The wheel of claim 1 wherein said fourth bearing is operationally positioned around said inner component at an angular location above a contact area of said ground engaging tread with the support surface during wheel use.

3. The wheel of claim 1 wherein said first bearing is operationally positioned around said inner component at said angular location of about 10° rearward of said vertical line.

4. The wheel of claim 3 wherein said second bearing is operationally positioned around said inner component at said angular location of about 115° forward of said first bearing, and wherein said third bearing is operationally positioned around said inner component at said angular location of about 120° rearward of said first bearing.

5. The wheel of claim 4 wherein said fourth bearing is operationally positioned around said inner component at said angular location approximately on said vertical line passing through said axis of rolling rotation.

6. The wheel of claim 1 further comprising a passive suspension system biasing said first bearing into operative engagement with said outer hoop bearing engaging surface.

7. The wheel of claim 1 wherein said rotationally stationary inner component comprises a symmetrical hoop.

8. The wheel of claim 1 wherein said rotationally stationary inner component comprises an asymmetrical hoop.

9. The wheel of claim 1 wherein said rotationally stationary inner component comprises a plurality of non-rotating radial spokes.

10. A wheel for a bicycle moving in a forward direction over a support surface, wherein the bicycle includes a head tube, the wheel comprising:

a rotationally stationary inner component;

a steerer tube connected to said inner component and receivable within the bicycle head tube;

a rotatable outer hoop comprising a bearing engaging surface and an axis of rolling rotation, wherein said outer hoop is concentric with said inner component;

a ground engaging tread disposed on said outer hoop;

a first bearing mounted on said inner component to be rotationally stationary therewith, said first bearing being operationally positioned around said inner component at an angular location between about −7° and 6° forward of a zero trail line, wherein said zero trail line corresponds to a theoretical radial line in said inner component vertically extending through said axis of rolling rotation when said inner component is removed from the bicycle and oriented such that said steerer tube is substantially vertically aligned, wherein said zero trail line theoretically rotates with said inner component when said inner component is rotated into an operational position such that said steerer tube is aligned with the bicycle head tube for use;

a second bearing mounted on said inner component to be rotationally stationary therewith, said second bearing being operationally positioned around said inner component at an angular location between about 110° and 120° forward of said first bearing;

a third bearing mounted on said inner component to be rotationally stationary therewith, said third bearing being operationally positioned around said inner component at an angular location between about 115° and 125° rearward of said first bearing; and a fourth bearing mounted on said inner component to be rotationally stationary therewith, said fourth bearing being operationally positioned around said inner component at an angular location within an obtuse angle formed between said second bearing, said axis of rolling rotation, and said third bearing.

11. The wheel of claim 9 wherein said fourth bearing is operationally positioned around said inner component at an angular location above a contact area of said ground engaging tread with the support surface during wheel use.

* * * * *